(12) United States Patent
Winkel et al.

(10) Patent No.: US 7,738,127 B2
(45) Date of Patent: Jun. 15, 2010

(54) PROXIMITY WARNINGS FOR REMOTE SERVICES

(75) Inventors: Jerry Curtis Winkel, Lindon, UT (US); Kenneth Allen Frost, American Fork, UT (US)

(73) Assignee: Novell, Inc., Provo, UT (US)

( * ) Notice: Subject to any disclaimer, the term of this patent is extended or adjusted under 35 U.S.C. 154(b) by 1126 days.

(21) Appl. No.: 11/137,944

(22) Filed: May 26, 2005

(65) Prior Publication Data

US 2006/0268319 A1 Nov. 30, 2006

(51) Int. Cl.
G06F 3/12 (2006.01)
G06F 15/00 (2006.01)
G06K 1/00 (2006.01)

(52) U.S. Cl. .................. 358/1.15; 358/1.13; 358/15

(58) Field of Classification Search ............ 358/1.1, 358/1.5, 1.9, 1.11–1.18
See application file for complete search history.

(56) References Cited

U.S. PATENT DOCUMENTS

| | | | |
|---|---|---|---|
| 5,561,704 A | 10/1996 | Salimando | |
| 6,240,069 B1 | 5/2001 | Alperovich et al. | |
| 6,351,647 B1 | 2/2002 | Gustafsson | |
| 6,415,323 B1 | 7/2002 | McCanne et al. | |
| 6,519,463 B2 | 2/2003 | Tendler | |
| 6,522,971 B1 * | 2/2003 | Tanaka | 701/209 |
| 6,873,258 B2 | 3/2005 | Marples et al. | |
| 6,879,939 B1 | 4/2005 | Lang et al. | |
| 7,206,091 B2 * | 4/2007 | Hagiuda | 358/1.15 |
| 2003/0011805 A1 * | 1/2003 | Yacoub | 358/1.15 |
| 2004/0075860 A1 * | 4/2004 | Shima et al. | 358/1.15 |

* cited by examiner

Primary Examiner—Thierry L Pham
(74) Attorney, Agent, or Firm—Schwegman, Lundberg & Woessner, P.A.

(57) ABSTRACT

Techniques for issuing proximity warnings for services are provided. A first location associated with a requestor that makes a request to a remote service is determined. A second location associated with the remote service is resolved. The first and second locations are compared. In response to the compare, a decision is made as to whether a warning message is issued to the requestor or as to whether the request is passed through to the remote service for processing.

12 Claims, 3 Drawing Sheets

PROXIMITY WARNINGS FOR REMOTE SERVICES

FIELD

The invention relates generally to networking and more particularly to proximity warnings for remote services.

BACKGROUND

Networking combined with device mobility has created unique opportunities for users. A user can use a device from virtually any location and connect to his preferred network for purposes of accessing desired services. This convenience has also presented a number of challenges for the users.

Take for instance an employee of an organization who works from home in the evening. When the employee boots his/her computer a connection is made to the Internet. The employee may be working on a personal or a confidential document. At some point, the employee may accidentally or deliberately, via a mouse click or keystroke, issue a print command. Since the print buttons on many applications may not even bring up a print dialogue box, the employee may print the document without even realizing it. Furthermore, even if the employee realizes that the print job was sent, it may be too late to cancel the print job. If the print job was sent to a remote printer, the employee will not able to manually stop the printer or for that matter may not be able to get back to the office before the print job is discovered and picked up by another employee of the organization.

This problem can be even more catastrophic for consultants who work at a particular customer site for a period of time and access printers at external companies during that period of time. When the contractor leaves the site, if the contractor does not remember to re-configure his/her default printer, trade secrets of another customer may be inadvertently discovered by a competitor.

It is also noted that any remote service configured and used by a device can experience this same type of problem as described above with the printer service example.

SUMMARY

In various embodiments, proximity warning techniques are provided for remote and networked services. More particularly and in an embodiment, a request for a remote service is detected from a requestor. A first location of the requestor and a second location for the remote service are resolved. The first location is compared against the second location and in response to the compare a determination is made as to whether to issue a warning to the requestor before the request is submitted to the remote service for processing.

DETAILED DESCRIPTION

A "service" includes a software application or combinations of applications that act as a system. A "remote service" indicates that a requestor and a device associated with the requestor are located some distance from the remote service, which is being requested by the requestor. For example, a requestor may use a laptop to connect over the Internet (e.g., Wide Area Network (WAN), etc.) to a local Intranet (Local Area Network (LAN)) for purposes of accessing the remote service that is located on the Intranet.

In other cases, the requestor may use a laptop or PDA to connect over a wireless LAN for purposes of accessing the remote service, in this case even though the requestor is on the same LAN it may be considered remote from the service, since communication is occurring wirelessly.

A "requestor" may be a user or another automated service. The network may be wired, wireless, or a combination of wired and wireless. The term "proximity" is a relative term that reflects a distance between a requestor's device and the remote service when a request for the remote service is made by the requestor. To resolve proximity, a location of the requestor's device is determined and a location of the remote service is determined. Location may be represented in a variety of manners, such as, but not limited to, an Internet Protocol (IP) domain or IP subnet; a longitude and latitude coordinate position obtained from a Global Positioning Satellite (GPS) system; hard coded and recorded locations that are relative to some known position, such as building numbers, floor numbers within buildings; area codes associated with caller identifiers; and the like.

Various embodiments of this invention can be implemented in existing network architectures. For example, in some embodiments, the techniques presented herein are implemented in whole or in part in the Novell® network and proxy server products, distributed by Novell®, Inc., of Provo, Utah. In an embodiment, the techniques presented herein are implemented as a service to the iPrint® product, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit embodiments of the invention.

Figure 1:
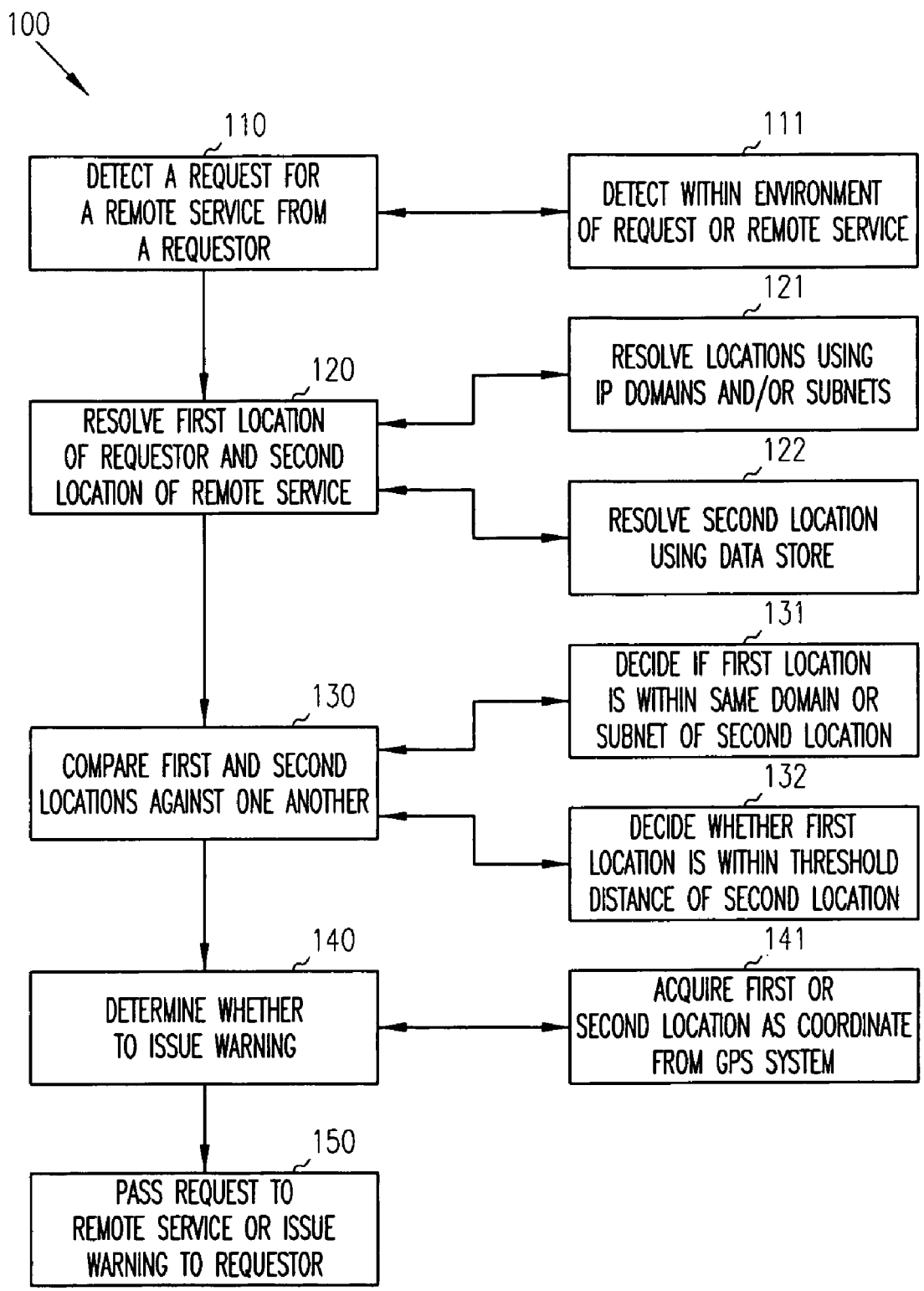
FIG. 1 is a diagram of a method for issuing a warning before access is granted to a remote service, according to an example embodiment.

FIG. 1 is a diagram of a method 100 for issuing a warning before access is granted to a remote service, according to an example embodiment. The method 100 (hereinafter "remote service warning service") is implemented in a machine-access and machine-readable medium and is accessible over a network. In an embodiment, the remote service warning service is implemented on a device or within the local environment of a requestor. In an alternative environment, the remote service warning service is implemented within the local environment of the remote service.

Initially, the remote service warning service is situated to detect requests issued from the requestor to the remote service or to detect requests being received at the location of the remote service. Accordingly, at 110, the remote service warning service detects a request for the remote service. Again, at 111, this detection may be achieved within the environment of the requestor or within the environment of the remote service. It should also be noted that the requestor and the remote service communicate with one another over a network.

At 120, the remote service warning service resolves a first location of the requestor and a second location of the remote service. Resolving the location may be achieved in a variety of manners. In an embodiment, at 121, the first and/or second locations may be resolved based on attributes associated with the IP address of the requestor or the remote service. The IP address may identify a particular domain or a particular subnet associated with either the requestor or the remote service.

According to an embodiment, at 122, the second location may be resolved using a data store that maps an identity or identifier associated with the remote service or some local component of the remote service to a specific location. For example, the local environment of the remote service may utilize a variety of wireless access points (WAP's). The WAP's are network components within reach of the environment of the remote service. Each is associated with an identifier, when a request comes in having a particular WAP identifier a check is made to the data store, where the location of that particular WAP is mapped to a second location. In this manner, the techniques presented herein for proximity detection may be made in a wireless setting as well as in a wired setting.

It should also be noted that the locations may be expressed relative to some known points. For example, a facility may be identified as including several buildings having unique identifiers, each building includes several floor identifiers, and each floor may optionally include other identifiers, such as North, South, East, West, or such as being near certain locations cafeteria, library, receptionist, office number, server room, etc.

Once the first and second locations are resolved for the requestor issuing the request and for the remote service, at 130, the first and second locations are compared against one another. The comparison operation can also be configured based on policies or profiles associated with the requestor, the remote service, the network, and/or an enterprise controlling the remote service. In an embodiment, at 131, the comparison checks to see of the IP domain address of the requestor and the domain of the remote service are the same for both the first and second locations. Also, at 131, the comparison may check to see if the IP subnet address of the first and second locations are the same.

In another embodiment, at 132, the comparison may decide whether the first location is within some threshold and configurable distance of the second location. If the locations are not in the same units of measure, then mapping tables may be used to ensure the comparison is properly performed relative to the threshold distance. Again, policies of a particular requestor or of a particular service may be used to acquire the initial threshold. Thus, depending upon the identity of a particular requestor and/or a particular service the threshold distance may change.

At 140, the remote service warning service makes a determination as to whether to issue a warning to the requestor in response to the results of the comparison performed at 130. In some cases, at 141, the first and/or second locations may be acquired as GPS coordinates and used to further assist in the determination as to whether a proximity warning should be issued.

If a decision is made to issue a warning, then the remote service warning service does not immediately pass the request of the requestor through to the remote service for processing; rather, a warning is sent to the requestor where the requestor can affirm that it wishes for the request to be processed in view of a distant located remote service or the requestor can cancel the request. If the request is cancelled, then it is not processed by the remote service. Thus, control can be provided to the requestor via a proximity warning. Previously, a requestor had no options since no proximity check was performed in advance of the remote service receiving the request from the requestor. Thus, an errant request was processed by the remote service even when the requestor may not have intended this to be the case.

If, at 150, a decision is made to not issue a warning in response to the comparison of the first location against the second location, then the request is passed through to the remote service for processing. In this situation, the requestor is within a desired or threshold distance of the remote service, such that based on policy or profile there is no need or desire to issue a proximity warning to the requestor before processing the request at the remote service.

In an embodiment, the processing of the remote service warning service may be implemented as a proximity engine to the remote service. The service may be any service accessed over a network, such as printing services, data store services, licensing services, facsimile services, and the like. An example embodiment where the remote service is a print service is provided below in the description of FIG. 2.

Figure 2:
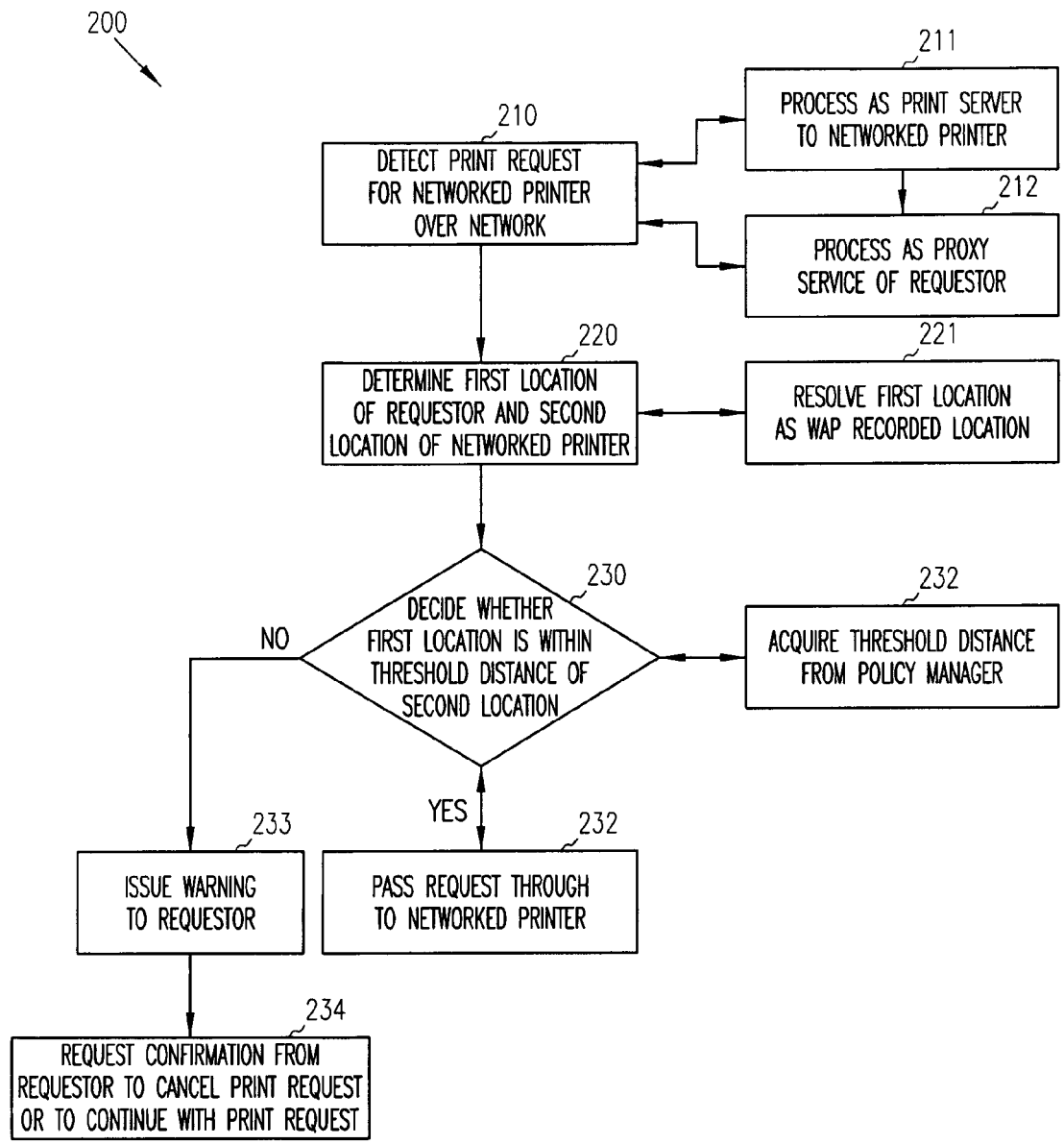
FIG. 2 is a diagram of a method for issuing a print warning before processing a remote print job, according to an example embodiment.

FIG. 2 is a diagram of a method 200 for issuing a print warning before processing a remote print job, according to an example embodiment. The method 200 (hereinafter "printer proximity service") is implemented in a machine-accessible and machine-readable medium and is operational over a network. The printer proximity service represents an embodiment and different perspective of the method 100 presented above with FIG. 1.

Initially, the printer proximity service detects a print request for a networked printer. The print request is issued from a requestor. In an embodiment, at 211, the printer proximity service is processed as a print server that controls and monitors access requests being made to the networked printer. In an alternative embodiment, at 212, the printer proximity service is processed as a proxy service on behalf of the requestor. The proxy service may be a transparent proxy or a forward proxy. In some cases, the proxy service may be a reverse proxy that controls and receives accesses made to the networked printer.

At 220, the printer proximity service determines a first location of the requestor and a second location of the networked printer. As was described above with respect to method 100 of FIG. 1, this may be achieved using the IP address information associated with the requestor and/or the networked printer. For example, the first and second locations may reside on the same domain or different domain. In cases where the first and second locations reside on the same domain, the first and second locations may reside on the same or different subnets within that same domain. If the requestor is accessing the networked printer via a wireless laptop, phone, and/or personal digital assistant (PDA), then the requestor and the networked printer will likely be on different subnets, in these situations a different technique may be further used to resolve the first location of the requestor to be a more accurate reflection as the true location of the requestor's device.

For example, at 221, the first location may resolve to a specific WAP device and its location. When a wireless device requests an IP address and the printer proximity service is on a same subnet, the printer proximity service receives a media access control (MAC) address of the wireless device. The MAC address may be stored in a table or data store. When the requestor's device roams between WAP's the printer proximity service keeps track of the current MAC address that the requestor's device is using to communicate with the networked printer and can compare that to locations associated with each WAP and stored in the table. Thus, each print request of wireless requestor may be resolved dynamically to obtain a current estimated first location for the wireless requestor's device.

As another example, if the printer proximity service is located on a different subnet, a MAC address may not be available to the printer proximity service for a wireless device. In this case, the client of the requestor tunnels or encapsulates the MAC address of the current WAP device and sends it to the printer proximity service. The printer proximity service can then access a table that associates the different WAP's over the environment of the networked printer with a specific first location for the requestor's wireless device.

In an embodiment, when a requestor's wireless device attempts to print via a print request issued over the network to a print server of the networked printer, the print server may forward the print request to the printer proximity service to resolve the first location of the wireless device. By using the first location of the wireless device and a known second location of the networked printer, a determination may be made as to whether to display a warning message on the wireless device of the requestor.

A variety of techniques may be used to resolve the first location of the requestor and a second location of the networked printer. For example, an IP addressing technique for a given site may be deployed in an address format as "site.building.floor.area," such that an example print request may identity the network printer via an address as "prv.h.5.nw," where "prv" refers to a Provo, Utah site, "h" refers to a building labeled "h," 5 refers to the fifth floor, and "nw" refers to the northwest area of the fifth floor.

In this example, various policies may also be implemented with respect to a specific site, specific networked printer, or specific requestor. For instance, one organization may have a building largely devoted to manufacturing. Though this building may be very large and may have many WAP devices, it may have only one printer. In such a case, the policy may prompt print warnings to occur if the site for a current WAP associated with a print request and the identified network printer do not match.

In another company, a single building with many floors may host, administration, marketing, sales, and development. Different departments may share the same floors. In such a case, a policy may be created that would require a complete match of the site, building, floor, and area; and if a match is not obtained then a print warning message is issued to the requestor's device.

Continuing with the description of FIG. 2, at 230, the printer proximity service decides whether the first location resolved for the requestor is within a threshold distance or confirms to a policy of the second location for the networked printer. Again, at 231, the policy may be obtained from a policy manger. The policy manager may be associated with profiles or policies associated with an organization, with the requestor, with the network, and/or with the networked printer.

If a decision based on the threshold distance or the policy indicates that no print warning is necessary, then, at 232, the print request is passed through the printer proximity service to the networked printer for servicing. In some cases, the printer proximity service may interact with a print server of the networked printer or a proxy of the requestor. In these cases, the original print request may be sent directly from the print server or the proxy to the networked printer after the print server or the proxy receive notice from the printer proximity service that it is okay or permissible to process the print request without a warning. In other situations, the printer proximity service may actually be implemented within the print server's functionality or the proxy service's functionality, such that no further communication need occur to pass the print request directly to the networked printer for servicing.

However, if, at 230, a decision is made based on the threshold distance or policy that the first location is not within an acceptable proximity to the second location, then, at 233, a warning message may be constructed and sent to the requestor over the network.

The warning message and actions associated with the warning message may be configured based on policies and dynamic resolved conditions. Thus, the message may be more intelligent to include specific security information associated with the unfavorable print request. In an embodiment, at 233, the warning may dynamically request a confirmation or a cancellation from the requestor before the print request is passed to the networked printer. In some other instances, policy may indicate that no print job should be permitted at all for a given condition, such that the warning message indicates the print job will not be processed at all.

One now appreciates how the proximity warning techniques for remote service may be implemented with respect to remote printing services. This technique may also be implemented with any remote service where proximity poses a security or performance issue for an organization.

Figure 3:
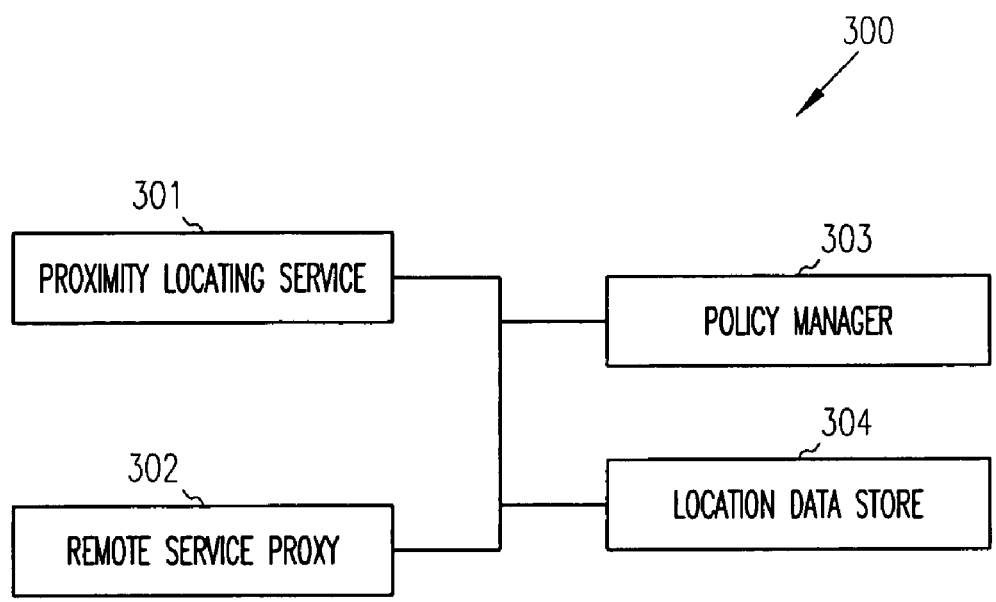
FIG. 3 is a diagram of a remote service proximity warning system, according to an example embodiment.

FIG. 3 is a diagram of a remote service proximity warning system 300, according to an example embodiment. The remote service proximity warning system 300 is implemented in a machine-accessible and machine-readable medium and is accessible over a network. The network may be wireless, wired, or a combination of wired and wireless. In an embodiment, the remote service proximity warning system 300 implements, among other things, the methods 100 and 200 of FIGS. 1 and 2.

The remote service proximity warning system 300 includes a proximity locating service 301 and a remote service proxy 302. In an embodiment, the remote service proximity warning system 300 may also include a policy manager 303 and/or a location data store 304. Each of these will now be discussed in turn.

The proximity locating service 301 provides proximity information for requests made by requestors to a remote service. The proximity locating service 301 resolves a first location associated with a request issued from a requestor's device and resolves a second location associated with the remote service. A variety of techniques were presented above with respect to FIGS. 1 and 2 for resolving locations associated with requesting devices and with remote services. These techniques may be used for wireless, wired, or a combination of wired and wireless communications.

The remote service proxy 302 interacts with the proximity locating service 301 by passing requests from requestors to the proximity locating service 301. In response to the requests, the proximity locating service 301 resolves first locations for requestors' devices and resolves second locations associated with remote services. Once the remote service proxy 302 has the first and second locations, it makes a determination as to whether to issue proximity warnings for the requests to the requestors or whether to pass the requests on to the remote services for processing. In making the determination as to whether to issue the proximity warnings, the remote service proxy 302 compares the first locations against the second locations. In some cases a threshold distance is used during the comparison. In other cases, one or more policies are used during the comparison.

In an embodiment, the remote service proximity warning system 300 also includes a policy manager 303 that supplies policies to the remote service proxy 302, which assists the remote service proxy 302 in deciding whether a proximity warning should or should not be issued. Examples of policies and enforcement of these policies was provided above with respect to the description of the method 200 of FIG. 2. The policy manager 303 may provide policies based on specific organization requirements, based on specific requestor profiles or configurations; based on specific remote service profiles or configurations; and/or based on specific network requirements. The remote service proxy 302 evaluates the policies supplied by the policy manager 303 in view of the comparisons between the first locations for the requestors and the second locations for the remote services.

According to an embodiment, the remote service proximity warning system 300 may also include a location data store 304. The location data store 304 is accessed or searched by the proximity locating service 301 for purposes of acquiring predefined or known locations for components of a local area network (LAN) associated with the remote services. For example, the LAN of the remote services may include one or more WAP devices to permit wireless communication with the remote services, each of these WAP devices may include identifiers and location information that the proximity locating service 301 can obtain from the location data store 304 via a search on identifiers for the WAP devices. These acquired locations can be associated with the first locations of the requestors that are known to be communicating through the WAP devices with the remote services.

The location data store 304 may also record known locations associated with the remote services being requested by the requestors. Thus, the proximity locating service 301 may use the location data store 304 to estimate and resolve first locations for wireless requestors and may use the location data store 304 to resolve second locations for the remote services.

It is noted, that the remote service proxy 302 may include the proximity locating service 301; that the remote service proxy 302 may reside within a local environment of the requestors; or that the remote service proxy 302 may reside within a local environment of the remote services. It is also noted, that although the term "proxy" is used that this term is not to be construed in a limiting sense. Thus, the remote service proxy 302 may be any service that intercepts or otherwise detects requests made by requestors for remote services and that enlist the services of the proximity locating service 301 for purposes of deciding whether to issue proximity warnings to the requestors or whether to pass requests through to remote services for processing.

Figure 4:
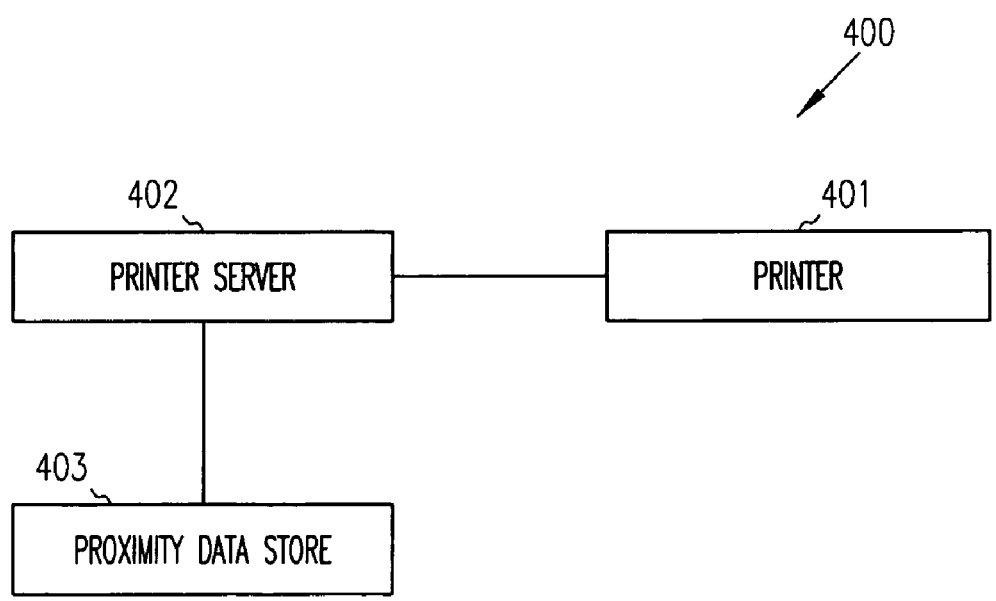
FIG. 4 is a diagram of a printer proximity warning system, according to an example embodiment.

FIG. 4 is a diagram of a printer proximity warning system 400, according to an example embodiment. The printer proximity warning system 400 is implemented in a machine-accessible and machine-readable medium and is accessible over a network. The network may be wired, wireless, or a combination of wired and wireless. The printer proximity warning system 400 represents an example implementation of the remote service proximity warning system 300 presented in FIG. 3. It is noted that other remote service may benefit from the teachings presented herein and these other remote services may be implemented in manners similar to what is discussed here for a remote print service.

The printer proximity warning system 400 includes a printer 401 and a print server 402. In an embodiment, the printer proximity warning system 400 also includes a proximity data store 403. Each of these will now be discussed in turn.

The printer 401 is a resource or a service that is remote from a requestor over a network. The printer is therefore enabled to be accessed over a network from a LAN or WAN connection to that network. Print requests issued from a requestor pass through the print server 402 before the printer 401 receives the print jobs for processing.

The print server 402 acts as a gate keeper and controller for the printer 401 and other printers that may reside on the network. Thus, any print requests issued to the printer 401 are first processed by the print server 402. The print server 402 resolves a first location for a given requestor that issues a print request (print job). Moreover, the print server 402 resolves a second location for the printer 401. In some cases, the location of the printer 401 may be preconfigured within the processing of the print server 402, such that the second location is known to the print server 402 and does not have to be resolved with each print request that is processed through the print server 402. It should also be mentioned that the functionality of the printer server 402 can be built into the printer 401; in such a manner that the requestor is communicating directly with the printer 401, which includes the features of the print server 402.

The print server 402 compares the first location of the requestor against the second location of the printer 401. Based on this compare, the print server 402 makes a decision as to whether to issue a proximity warning to the requestor over the network or whether to pass the print request directly through to the printer 401 for immediate processing on behalf of the requestor.

In an embodiment, the printer proximity warning system 400 may access a proximity data store 403 for purposes of resolving the first location and/or second location. For example, a first location may be resolved by identifying the request with a specific network wireless WAP device, where that WAP device includes an identifier. The identifier is detected by the print server 402 and searched for in the proximity data store 403, the search result returns a location for the given WAP identifier, and that location can be estimated to be the first location of the requestor. In other cases, the printer 401 may be regularly moved throughout the network, such that the print server 402 dynamically searches the proximity data store 403 to dynamically resolve a second location for the printer 401.

The print server 402 may use policies or threshold distances when comparing the first and second locations against one another. These criteria permit the print server 402 to make a dynamic decision for a given request as to whether to issue a proximity warning or as to whether to process the request on the printer 401.

In an embodiment, any issued proximity warning may provide detailed information about the warning to the requestor and may permit the requestor to override the warning, which instructs the print server 402 to immediately pass the print request through to the printer 401 for processing. A requestor may also cancel a print request in response to the warning. In some cases, based on policy, the print server 402 may not permit any overrides and may issue the proximity warning to the requestor informing the requestor that the print request cannot be processed given the current conditions in response to a policy.

One now fully appreciates how proximity detecting and resolving services and systems may be implemented to issue proximity warnings for location-sensitive remote services. These techniques account for modem-day problems experienced with highly connected and networked environments, and these techniques do not require any modification to existing networked services to be implemented and realized.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a machine-readable medium and to execute on a device, the method, comprising:
   detecting a request for a remote service from a requestor;
   resolving a first location of the requestor and a second location for the remote service;
   comparing the first location to the second location; and
   determining in response to the comparison whether to issue a warning to the requestor before the request is submitted to the remote service for processing, the requestor is a user and permitting the user to affirm the request for processing in view of the warning and giving control to the user as to whether to process the request, the comparison based on a threshold distance between the first and second location and the threshold distance is obtained based on a particular identity for the requestor, the threshold distance changes depending upon identities of requestors.

2. The method of claim 1, wherein resolving further includes determining the first location of the requestor in response to an Internet Protocol (IP) address associated with the requestor.

3. The method of claim 1, wherein resolving further includes determining the second location of the remote service in response to a data store having location information associated with the remote service.

4. The method of claim 1, wherein resolving further includes determining the second location of the remote service in response to an Internet Protocol (IP) address associated with the remote service.

5. The method of claim 1, wherein comparing further includes deciding whether the first location is in a same domain as the second location.

6. The method of claim 1, wherein comparing further includes deciding whether the first location is in a same subnet as the second location.

7. The method of claim 1, wherein determining further includes acquiring at least one of the first location and the second location as geographic coordinate positions acquired from a Global Positioning Satellite (GPS) system.

8. A method implemented in a machine-readable medium and to execute on a device, the method, comprising:
   detecting a print request for a networked printer over a network; determining a first location of a requestor for the print request and a second location for the networked printer;
   deciding whether the first location is within a threshold distance of the second location, and if not, issuing a warning message to the requestor before passing the print request to the network printer for servicing, and wherein the requestor is a user and when the warning message is issued, the user has control to affirm that the print request is still to be processed, the threshold distance determined based on an identity for the requestor, the threshold distance changes depending upon identities of requestors.

9. The method of claim 8, wherein the device is as a print server and processing the method manages the print request on behalf of the networked printer and that acts as an intermediary between the requestor and the networked printer.

10. The method of claim 8 further comprising, processing the method as a proxy service associated with at least one of the requestor and the network printer.

11. The method of claim 8, wherein deciding further includes acquiring the threshold distance from a policy manager.

12. The method of claim 8, wherein determining further includes resolving the first location in response to a recorded location of a wireless access point which transmits the request on behalf of the requestor to the networked printer.

* * * * *